April 7, 1925.

W. G. BURNS ET AL

ROASTER

Filed Sept. 15, 1922

INVENTORS
William G. Burns,
Harry R. Maxon,
BY
ATTORNEY

April 7, 1925.

W. G. BURNS ET AL 1,532,574

ROASTER

Filed Sept. 15, 1922  2 Sheets-Sheet 2

INVENTORS
William G. Burns,
Harry R. Maxon,
BY
ATTORNEY

Patented Apr. 7, 1925.

1,532,574

UNITED STATES PATENT OFFICE.

WILLIAM G. BURNS, OF NEW YORK, N. Y., AND HARRY RUSSEL MAXON, OF MUNCIE, INDIANA, ASSIGNORS TO JABEZ BURNS & SONS, A CORPORATION OF NEW YORK.

ROASTER.

Application filed September 15, 1922. Serial No. 588,414.

*To all whom it may concern:*

Be it known that we, WILLIAM G. BURNS and HARRY R. MAXON, citizens of the United States, and residents of New York city, county and State of New York, and Muncie, in the county of Delaware and State of Indiana, respectively, have invented certain new and useful Improvements in Roasters, of which the following is a specification.

The present invention relates to machines for roasting coffee, nuts, or cereals, and has for its object to provide an improved machine of the above class which will produce a more uniform and better roasted product with better gas economy, by having the heat more uniformly produced, more accurately controlled, and more easily regulated than heretofore.

The process of roasting coffee, nuts, and other food articles is a delicate one, requiring a precise heat to get the best results without damaging the goods. It also requires a careful and uniform application of heat to evenly roast all particles alike. In a type of machine on the market in which air is passed in contact with a flame and then conducted through the material to be roasted, satisfactory operation and results have not always been obtained. Also, indirect heating methods have been atempted, which have also been uneconomical and have varied the product.

After a long series of experiments with various forms of moving conveyers for carrying the goods to be roasted, and of flames, burners and control methods therefor, we have discovered that while a conveyer can be relied upon to properly tumble the goods while being roasted, it will not alone insure uniformity of roasting, and that owing to the air currents set up in the cylinder, the nature and disposition of the flame must be modified over previous practice to secure the desired results. We have further found that if the flame be produced in such manner as to be of uniform and even temperature and susceptible of very fine control at the burner for size and temperature and varying according to the requirements of the material being treated, that uniform results in roasting can be secured notwithstanding the moving conveyer, which does not adversely affect the flame produced by this invention. We have found that a homogeneous flame will properly heat the air which heats the conveyer, and that previous unsatisfactory results in roasting have been largely due to faulty flame production. For example, a Bunsen burner flame is either likely to spot the material to be roasted, or to unevenly heat the air which passes through the conveyer, and thus not equally heating both the conveyer and the material thereon as uniformly as is desired.

In roasting coffee for example, a large volume of steam is given off with the result that the flame is yellowish, combustion is poor, and the flame is not steady because of air currents due to the lifting or agitating conveyer. Since suction is usually applied to the roaster, the greater the excess air supplied for completing combustion the less will be the economy because the excess air cools the flame as well as the material. In those roasters in which the velocity of the gas draws in some air the results are not satisfactory because the flame is not of uniform temperature throughout, is apt to unevenly heat the air and material and is not easy to control.

In order to overcome these objections, the present invention has been devised to provide an elongated homogeneous comparatively slow flame which is directed substantially axially of the conveyer, and which is of substantially even temperature throughout its length, and has been found in practice to more uniformly roast all particles of the material.

In a preferred embodiment of the present invention, a rotary conveyer is charged with the material to be roasted, such as green coffee, and a slow and substantially homogeneous gas flame is directed transversely parallel to the conveyer surface to insure the desired type of flame best adapted for roasting. The necessary air for complete combustion is mechanically pre-mixed with the fuel gas and the resultant mixture horizontally fed out of the burner nozzle at a rate just fast enough to prevent back-firing in order to keep the flame contiguous to the nozzle. This produces a homogeneous flame, which is adapted to evenly give up its heat to the material to be roasted, and is accomplished by the arrangement and location of parts hereinafter described.

Referring to the drawings.

Figure 1:
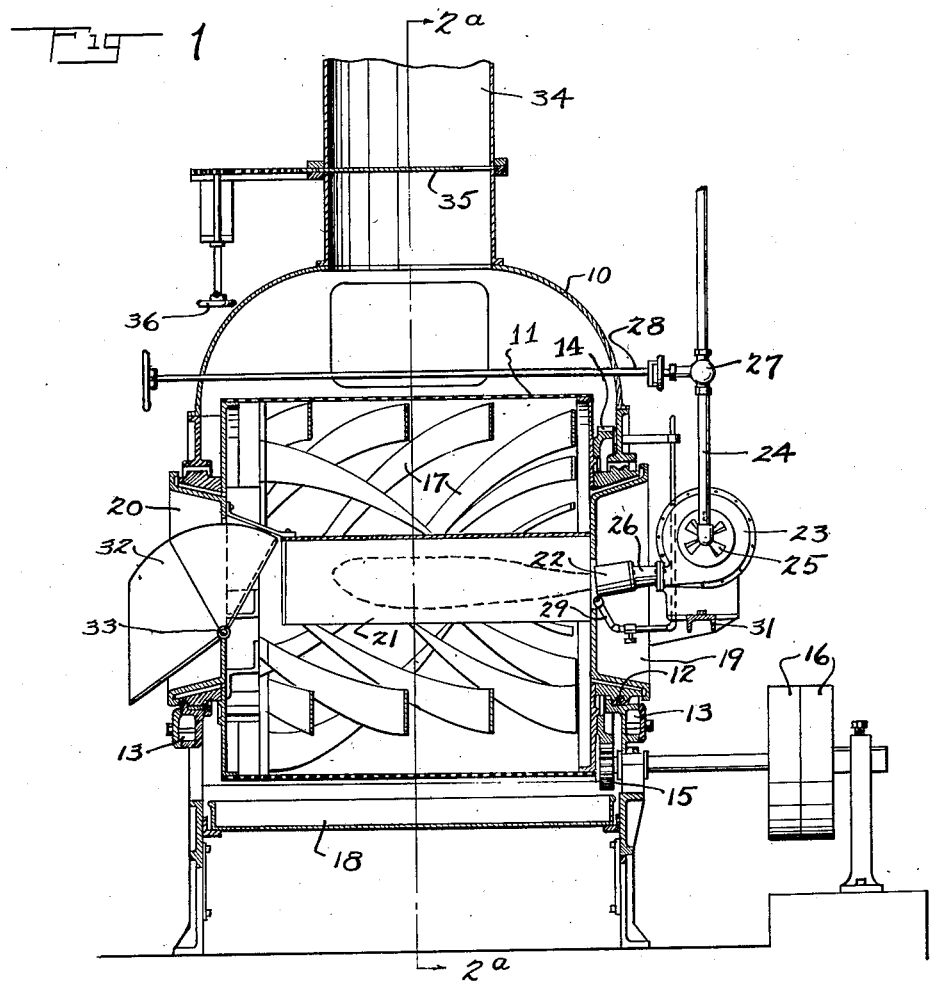
Fig. 1 is a longitudinal vertical section through a coffee roaster embodying the present invention.
Figure 4:
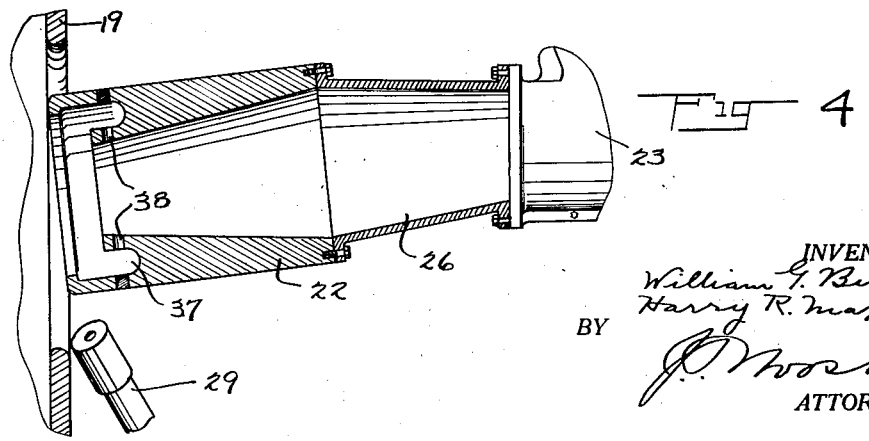
Fig. 4 is an enlarged detail section of the nozzle.
Figure 2:
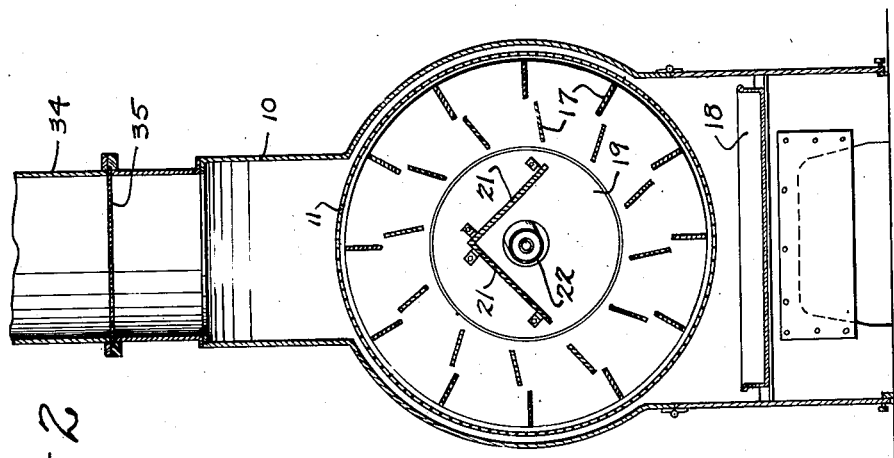
Fig. 2 is a section on the line 2ª—2ª of Fig. 1.
Figure 3:
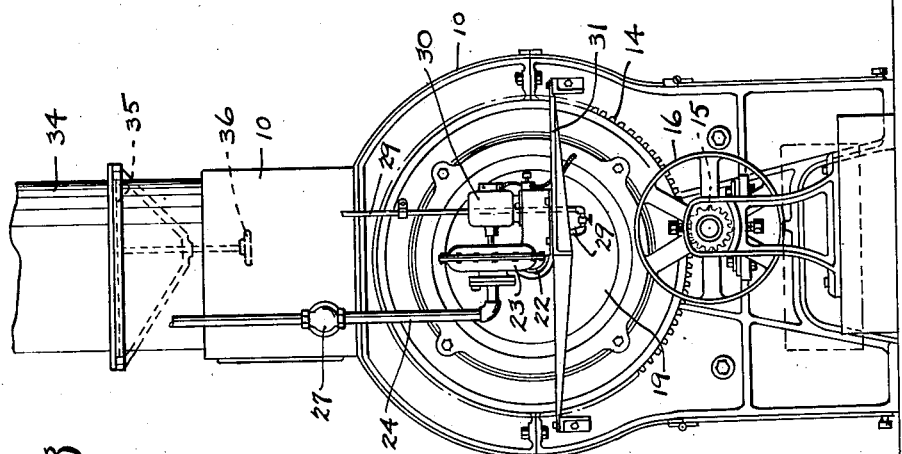
Fig. 3 is an end view from the right of Fig. 1.

In the drawings, 10 designates the enclosing casing of the roaster in which is mounted the rotary conveyer drum 11 adapted to hold the material to be roasted. For driving the conveyer, a gear 14 is mounted on one end for cooperation with a pinion 15 driven through pulleys or other driving means 16. Located within the drum are a plurality of helical lifting vanes 17 for carrying the material from the bottom to the top and constantly agitating the grains during roasting. A pan 18 is located beneath the container for holding chaff which falls through the perforations of the drum. The ends of the casing 10 and drum 11 may be closed by stationary castings 19 and 20 bolted, or otherwise secured to the frame. Within the central portion of the drum and supported from the end members 19 and 20, is a hood 21 for preventing the transversely moving lengthwise extending sheet of particles of material coming in direct contact with the flame. The flame as diagrammatically shown in dotted lines in Figure 1 of the drawing extends from a nozzle 22 located at an end portion of the drum in a direction substantially parallel with the axis of the container and in the present invention is about 4 inches in diameter or roughly twice the diameter at the top that it is at the nozzle extending from about 24 to 30 inches in length or preferably about two-thirds of the length of the container, although of course means are provided for regulating the length and size of the flame. The flame is of a kind not previously obtained with any roaster and is approximately cylindrical in shape. The nozzle points slightly downward and to one side so that under the combined influence of the revolving cylinder and smoke-pipe draft the flame is substantially horizontal. A blower 23 is shown as being mounted on a suitable platform 31 bolted or otherwise secured to the casing and driven by a motor 30. The pipe 24 supplies fuel gas to the blower or mixer at the central portion thereof, and apertures 25 in the blower casing are arranged around the entrance of the pipe 24 in order to supply the necessary air to be mixed with the gas for complete combustion. An appropriate damper may control the size of openings 25. The blower is adapted to mix the fuel gas and air in a more thorough and better mixture than an injector type of mixer. A substantially short passageway 26 connects the blower with the nozzle. A valve 27 may be located in the gas supply line and since it has been found that the quantity of air needs little or no further regulation, and that the gas supply is the only control usually necessary to adjust the length of flame after proper mixture is obtained, a control rod 28 may project from the valve 27 through the casing to the front or chute end of the roaster in order that an operator may carry on all adjustments from the front of the roaster. An auxiliary gas supply pipe 29 may be led around adjacent the nozzle to provide a pilot flame. At the front end of the roaster is provided a filling and emptying chute 32 pivoted at 33 in the usual manner. A little air from the outside must be drawn in around the nozzle for the purpose of carrying off any steam or smoke under the hood, and this air, together with the products of combustion, is drawn through the rotating drum 11 and out of the exhaust passageway 34. Some convenient form of damper 35 and control 36 may be located in the passageway 34.

The mixture of air and fuel gas from the blower is supplied to the nozzle at a rate just fast enough to prevent back-firing. Since a slow homogeneous flame is provided and the mixture of air and gas is thorough and since the mixture is fed to the nozzle just fast enough to prevent the flame slashing back, combustion will usually occur from the nozzle outwardly. However, as an additional means to insure that combustion takes place at the nozzle under increased pressures, an auxiliary pocket or combustion chamber 37 is provided around the nozzle, a small amount of fuel gas travels through the openings 38 into the combustion pocket 37 and ignition of the gas in this pocket 37 is an additional means of insuring combustion always at the nozzle.

These machines are of a type intended to roast products in large quantities, for example, to roast coffee at the rate of about six tons per day. They require a method of burning gas at the rate of about a quarter of a million cubic feet per month and this large amount of fuel should be under perfect control and burned in an economical manner, both of these results being obtained under this invention.

Among the advantages of the present invention, may be mentioned that a better and brighter roasted product is obtained than has been possible in previous machines on the market. The coffee and other food products are found to be more uniformly and evenly roasted, probably because the heated air drawn through the drums was more evenly tempered by a substantially slow and homogeneous flame. The use of a blower insures a thorough mixture of air and gas for complete combustion. Not only is a more uniform flame produced than occurred with burners using air under pressure of a pound or two issuing from a nozzle siphoning in gas but the power economy is large. With that old form a 1 horsepower motor was necessary while a ⅛ horsepower motor is all that is needed for the same size of roaster and the mixture of gas and air is more complete. Increased economy is also attained because less air is necessary to be drawn in around the flame. The present invention obviates a large amount of cleaning which has been heretofore necessary with old burners employing a plurality of small drilled holes, and the burner, hood and interior parts do not soot up. The absence of all pipes projecting into the container is an advantageous feature because no places are formed where the material may become lodged and charred. It will be seen from the drawing that the nozzle does not project into the rotary container nor inside the inner face of the end wall of said container. Since it is found that the air intake to the blower needs little or no adjustment, the flame may be regulated from a single gas control accessible from the front of the roaster.

By this invention, a distinct advance has been made in the art of roasting coffee, cocoa, cereals and other foods where the delicate aromas and flavors are to be brought out and preserved, by the cooperation between the heat producing, conducting and delivering means. Also, we have secured economy in gas, attendance, and cleaning, with a much greater uniformity of product than has heretofore been obtained in previous roasters.

I claim:

1. In a roaster for coffee and like food products, the combination with means for producing a homogeneous elongated flame, of means for passing the material transversely of and adjacent said flame.

2. In a roaster for coffee and like food products, the combination with means for producing a homogeneous elongated flame, of a container for material, and means for discharging the material in a sheet extending lengthwise of and adjacent said flame.

3. A food product roaster comprising a conveyer for the material and means to produce a homogeneous elongated flame substantially parallel to and spaced from said material.

4. In a roaster for coffee and like food products, the combination with means for producing a homogeneous, elongated, horizontal flame, of means for discharging material by gravity adjacent said flame.

5. In a food products roaster, the combination with a rotary drum, of means for producing a homogeneous elongated flame within said drum and means for deflecting the falling material contained in said drum from said flame.

6. In a roaster for coffee and like food products, the combination with means for producing a homogeneous, elongated, horizontally directed flame, of a lifting conveyer extending parallel to said flame for lifting and dropping material adjacent said flame.

7. In a roaster, the combination with a container for the material to be roasted, of a flame nozzle adjacent the container, means for shielding the material in the container from the direct action of the flame, means for mechanically and thoroughly mixing fuel gas with substantially the requisite amount of air to insure complete combustion, and feeding said mixture to the nozzle at a rate of flow at least fast enough to prevent back-firing, whereby to produce a homogeneous, elongated flame burning from said nozzle outwardly, and to uniformly heat the air for roasting the material in the container.

8. In a roaster, the combination with a rotary drum adapted to contain the material to be roasted, of a nozzle adjacent the drum and disposed to direct an elongated flame substantially longitudinally within the drum, a blower adapted to mix fuel gas with substantially the amount of air to produce complete combustion and feed said mixture to the nozzle to produce a homogeneous elongated flame extending from the nozzle a substantial distance lengthwise of said drum, and means for drawing heated air from the flame through the drum.

9. In a roaster, the combination with a drum adapted to contain the material to be roasted, of a flame nozzle adjacent and directed within the drum, baffle plates for keeping the flame from the contents of the drum, means for passing heated air from the flame through the drum for roasting the material, a fan having a central opening to the atmosphere, said fan being located adjacent the nozzle, a gas supply pipe connected with the fan, a valve for said pipe, and means for driving said fan to mix the gas with enough air to afford substantially complete combustion and feed the mixture to the nozzle at a rate at least fast enough to prevent flashing back of the flame and provide a homogeneous elongated flame of complete combustion projecting from the nozzle longitudinally of the drum for uniformly heating the air for roasting.

10. In a roaster, the combination with a rotary drum for the material to be roasted, of a burner adjacent and directed within the drum for heating the contents thereof, baffle plates to shield the drum contents from the burner flame, a fan adapted and arranged to receive air at substantially atmospheric pressure, an unobstructed conduit leading from the fan to the burner, a valve for regulating the quantity of air admitted to the fan, a pipe for supplying fuel gas directly to the fan, a valve for controlling the supply of gas, means outside the fan for driving the same, said fan being adapted to supply the mixture for complete combustion at the lowest rate necessary to prevent back-firing, and means for conducting heated air away from the flame and through the material to be roasted.

11. In a food roaster, the combination with a casing, of a conveyer for agitating the material within the casing, means at one end of said casing for producing an elongated homogeneous flame within the casing axially of the conveyer and means for controlling the length of said flame from the other end of said casing.

12. In a roaster for coffee or the like, the combination with a rotary drum for the material to be roasted, of a nozzle adjacent an end of the drum and adapted to direct an elongated flame substantially longitudinally within the drum, a blower for mixing air and fuel gas and supplying said nozzle to form a slow flame, means comprising an ignition pocket around said nozzle for insuring the flame remaining in contact with the nozzle regardless of the length of the flame, and means for drawing air from the flame, through the drum and material, and exhausting said air from the roaster.

13. In a roaster, the combination with a drum adapted to contain the material to be roasted, of a burner adjacent the drum for directing an elongated flame substantially axially inside the drum, an inclined hood for keeping the flame from the contents of the drum, a chute at one end of the drum for filling and emptying the same, means for passing heated air from the flame through the drum for roasting the material, a fan having a central opening to the atmosphere and adjacent the nozzle, a gas supply pipe connected with the fan, a valve for said pipe, a handle on the chute end of said roaster for controlling the gas supply, and means for driving said fan to mix the gas with enough air to insure complete combustion and feed the mixture to the nozzle at a rate at least fast enough to prevent flashing back of the flame.

14. The method of roasting coffee which comprises supplying air and gas to a mixer, the latter at a low pressure and the former at substantially atmospheric pressure, regulating the gas and air to the relative proportions required for complete combustion, mechanically and thoroughly mixing the gas and air, conducting the resultant mixture to a burner, burning the mixture in a long slow homogeneous flame, maintaining the speed of flow of the mixture at the lowest rate necessary to prevent back-firing, shielding the coffee from the direct action of the flame, and passing air in contact with the flame and through the coffee to be roasted.

15. In a roaster for coffee, cereals and the like, the combination with a rotary container for the material, of a lifting conveyor for agitating the material, end walls for the container, a flame nozzle located adjacent an end wall but outside the inner face of said end wall, means for passing a current of air through said container, means for mechanically and thoroughly mixing air and fuel gas and supplying the mixture to said nozzle at a rate at least fast enough to prevent the flame flashing back and to form a homogeneous flame extending from said nozzle lengthwise and substantially horizontal within the container.

16. In a roaster, a rotary conveyor for lifting the material to be roasted and dropping it vertically adjacent to a flame, and means for producing a homogeneous elongated flame parallel to but spaced from the path of the falling material to effect the desired roasting indirectly by air heated by said flame.

17. In a roaster, a rotary conveyor for lifting the material to be roasted and dropping it adjacent a flame, a deflecting hood to receive the falling material, and means for producing a homogeneous elongated flame under the hood, spaced from the material falling from the hood to effect the desired roasting indirectly by air heated by said flame.

Signed at New York in the county of New York and State of New York this 14 day of September, A. D. 1922.

WILLIAM G. BURNS.

Signed at Muncie, in the county of Delaware and State of Indiana this 11th day of September, A. D. 1922.

HARRY RUSSEL MAXON.